April 29, 1969 W. W. SHRADER 3,441,931
MOVING TARGET INDICATOR CLUTTER REDUCING APPARATUS
Filed Jan. 22, 1968 Sheet 1 of 3

INVENTOR
WILLIAM W. SHRADER
BY Robert Bruce Brodie
ATTORNEY

INVENTOR
WILLIAM W. SHRADER
BY Robert Bruce Brodie
ATTORNEY

United States Patent Office 3,441,931
Patented Apr. 29, 1969

3,441,931
MOVING TARGET INDICATOR CLUTTER REDUCING APPARATUS
William W. Shrader, West Newton, Mass., assignor to Raytheon Company, Lexington, Mass., a corporation of Delaware
Filed Jan. 22, 1968, Ser. No. 699,621
Int. Cl. G01s 9/42
U.S. Cl. 343—7.7                                                               7 Claims

ABSTRACT OF THE DISCLOSURE

A moving target indicator clutter reducing apparatus for use with an object location system having a first and second signal processing path. The first signal processing path is responsive only to the phase information of each pulse of a series of periodically received echo pulses for generating a signal varying as the phase difference between successive pulses and a reference phase. The second path includes means for extracting the pulse envelope from each pulse. Signal enhancement is achieved by means for forming a product signal of the phase difference signal and the pulse envelope.

BACKGROUND OF THE INVENTION

This invention relates to an apparatus which discriminates between moving and fixed objects in an object location system, and more particularly, to apparatus which rejects signals reflected from fixed objects in such a moving target indication apparatus.

The most common type of moving target indication apparatus (MTI), called coherent MTI, utilizes the Doppler shift imparted on the reflected signal by a moving target to distinguish moving targets from fixed targets. In a pulse radar system this Doppler shift appears as a change of phase of received signals between consecutive radar pulses. It is significant as to whether there is a time change between pulses. This is determined by comparing the phase of each received signal to the phase of a reference oscillator. If the target is fixed, the relative phase of consecutive received pulses does not change. If the target moves between the pulses, the phase of the received pulses changes.

The extraction of the relative phase information between consecutive pulses at a radar receiver is implemented through the use of a delay line canceller with single or multiple delay line cancellation stages. Reference may be made to "Introduction to Radar Systems," by Skolnik, published by the McGraw-Hill Book Company, New York, 1962, pp. 116–120 and 134–136.

Typically, the canceller is positioned in a radar receiver at a point where the carrier frequency of incident signals has been translated down to a lower intermediate frequency range. Such systems are connected to the radar receiver through a linear-limiting amplifier. An example of such prior systems may be seen in FIGS. 1 and 3 of U.S. Patent 3,042,915, issued to E. C. Nordell on July 3, 1962. The limiter is essential for normalizing the clutter residue and noise. It has been used in canceller systems for many years. The inclusion of the linear-limiting amplifier, however, seriously affects the improvement obtainable with multiple delay line cancellers because of the increased spectral spread of the clutter that exceeds the limit level. In this regard, the additional clutter spectral components come primarily from the sharp discontinuity in the envelope of returns as the clutter reaches the limit level.

One figure of merit used to measure MTI performance is designated the MTI Improvement Factor and is set forth in part VI, chapters 1–4 in "Modern Radar Analysis, Evaluation, and System Design," by Berkowitz, published by John Wiley and Sons, New York, 1965. The improvement factor is defined as the average power output ratio of target signal to clutter divided by the average power at the input to the receiver of the target signal to clutter.

Restated, the increased spectral spread of clutter signals comes as a consequence of the amplitude limiting of the train of echo pulses prior to cancellation, which amplitude limiting decreases the MTI improvement factor of the system.

As a general proposition, a pulse Doppler echo may be embedded in the clutter return from fixed targets as well as in the noise. Thus, in order to extract the target signal, the clutter must be cancelled and the noise eliminated.

It is accordingly an object of this invention to devise an MTI clutter reducing apparatus. It is a more specific object of this invention to retain the advantages of limiting the amplitude variation of the received echo signals to the dynamic range of the system while increasing the MTI improvement factor of the apparatus.

SUMMARY OF THE INVENTION

This invention satisfies the above objects in an embodiment which applies only phase information from each pulse of a train of pulses at the carrier frequency to a conventional canceller. The canceller generates a signal varying as the phase difference between successive pulses and a reference phase. A detector extracts the pulse envelope from each pulse. If the phase difference signal from the canceller is multiplied by the extracted pulse envelope in a suitable product-forming means, then a substantially reenforced, clutter free, phase difference signal results.

The application of phase only information is equivalent to eliminating all the amplitude information. This is called "hard limiting" a signal. This, of course, also eliminates the encrusting of unwanted signals. However, the MTI signal is still embedded in noise or clutter residue as it appears from the canceller. This is then recovered, by multiplying this signal by the detected pulse envelope.

Illustratively, the embodiment may be considered to be formed by a first processing path to which an incident pulse train is applied, which incident pulse train is first "hard limiting" by a tuned amplifier or filter. Consequently, only phase information is applied to a conventional canceller. The output of this signal is applied as one of the inputs to the multiplier, or product-forming circuit. A second parallel branch, also responsive to each pulse in the received echo signal pulse train, includes a linear-limiting amplifier having a dynamic range adjusted to be approximately equal to the clutter attenuation expected in the first processing path. The pulse envelope is extracted from the output of the linear-limiting amplifier. A weighting network may be interposed between the detector and the second input to the multiplier. This weighting network advantageously alters the detector characteristic so that the output of the multiplier will be a constant noiselike signal when the applied incident signals contain only clutter and noise.

DESCRIPTION OF THE PREFERRED EMBODIMENT

The MTI clutter reducing apparatus described in this embodiment is adapted for use at the intermediate frequency stages in a radar receiver. Accordingly, each pulse of a series of periodically received echo pulses has its carrier frequency translated from a radio-frequency range in the order of several hundred megacycles per second down to a lower or intermediate frequency range in the order of thirty megacycles per second.

Figure 1:
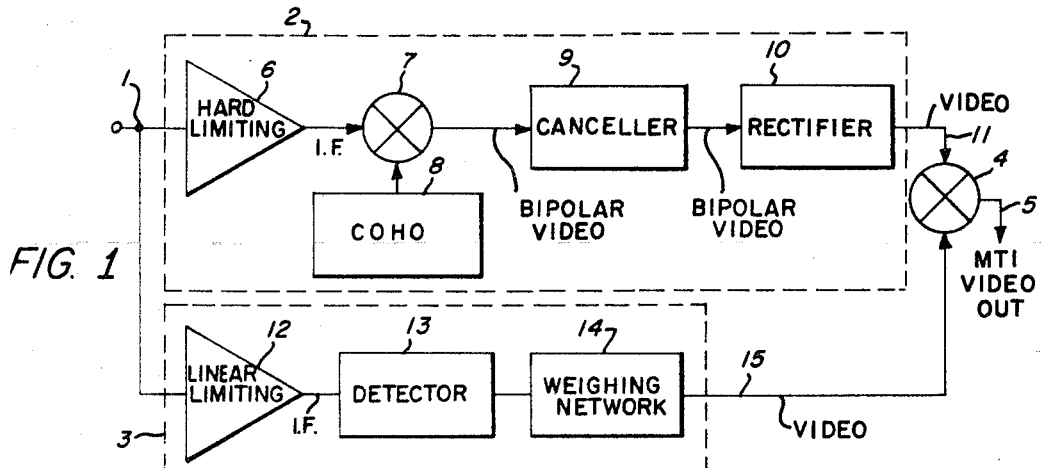
FIG. 1 shows a block diagram of the MTI clutter reducing apparatus.

In FIG. 1 the IF signals are supplied at input node 1. A first signal processing branch 2, which extracts the Doppler signal and reduces clutter, is coupled to one input of multiplier 4 over line 11. A second signal processing branch 3, which extracts the pulse envelope of each burst of received translated down carrier frequency signals applied to node 1, is coupled as a second input to multiplier 4 over line 15. A product signal, formed by multiplier 4, is applied to an MTI indicator over line 5.

The first branch 2 comprises a hard limiting amplifier 6, a conventional canceller 9, and an interconnecting phase detecting apparatus 7 and 8. Each burst of IF signals is applied to the hard limiting amplifier 6 from which only a signal indicative of phase information is preserved. This signal is applied to heterodyne 7 and beat against a reference signal obtained from oscillator 8. A signal varying in polarity and *amplitude* is produced as a measure of the *phase difference* between the hard limiting amplifier output and the reference signal. Parenthetically, oscillator 8 may be a coherence oscillator abbreviated COHO. In a coherent system, a phase reference is established for each transmitted pulse. This may be done by taking a sample of the transmitted pulse and then using this pulse to phase lock the COHO. The COHO then becomes the reference oscillator for the received signals.

Canceller 9 may be any form of conventional canceller such a single or multiple delay line cancelling arrangement as, for example, shown on pp. 151 and 152, FIG. 4.41 in "Introduction to Radar Systems" by Skolnik, published by McGraw-Hill in New York, 1962. The amplitude varying signal obtained from the phase detector and applied to canceller 9 is also termed bipolar video. The amplitude difference signals representing reference phase changes between successive pulses appear at the output of the canceller and also may be bipolar. In order to simplify operation of the multiplier 4 the canceller output is rectified by full-wave rectifier 10.

The second path 3 comprises a linear limiting amplifier 12 and a weighting network 14 intercoupled by detector 13. The dynamic range of the linear limiting amplifier is adjusted to be approximately equal to the clutter attenuation expected in the first processing channel. Bursts of carrier frequency applied at node 1 are amplified and limited by amplifier 12 and applied to detector 13. The detector extracts the pulse envelope from the linear limiting amplifier output and applies said envelope to weighting network 14.

The voltage transfer characteristic of weighting network 14 may be selectively adjusted to alter the response characteristic of detector 13 to compensate for any non-linearity in the characteristic curve of the detector. A further consequence of this modification of the detector characteristic is that the output of the multiplier can be maintained at a constant level where the IF input signals to the system at node 1 consist only of clutter or noise.

Multiplier 4 forms a substantially reenforced clutter-free phase difference signal as the product of the phase difference signal applied on line 11 and the pulse envelope appearing on line 15.

Figure 2:
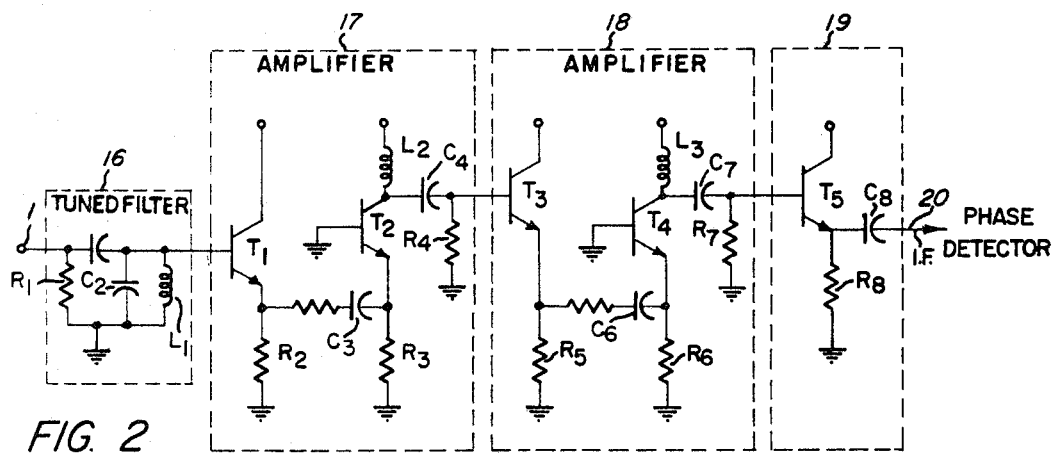
FIG. 2 is a circuit level diagram of the hard-limiting amplifier shown in FIG. 1.

FIG. 2 shows a hard limiting amplifier appearing as element 6 in FIG. 1. A representative filter arrangement is set forth in which inductance $L_1$ forms a tuned circuit relationship with capacitor $C_2$ and $C_1$. The hard limiting amplifier is tuned to respond in the 30 megacycles per second range. The signal extracted from tuned filter 16 is applied across a high impedance and amplified to a level sufficient to be able to apply the phase information to phase detector 7 and 8. To implement this, two amplification stages 17 and 18 are used. The last amplification stage 18 terminates in an output impedance stage 19. Each of the amplification stages comprises an emitter follower i.e. $T_1$ and $T_3$. The emitter follower terminates the signal from the last stage and couples the signal to a grounded base transistor amplifier i.e. $T_2$ and $T_4$ through an RC coupling network $R_3C_3$ and $R_6C_6$. The hard limiting action may be achieved by any well-known biasing arrangement applied to the active circuit elements so as to cause them to saturate at the desired signal level.

Figure 3:
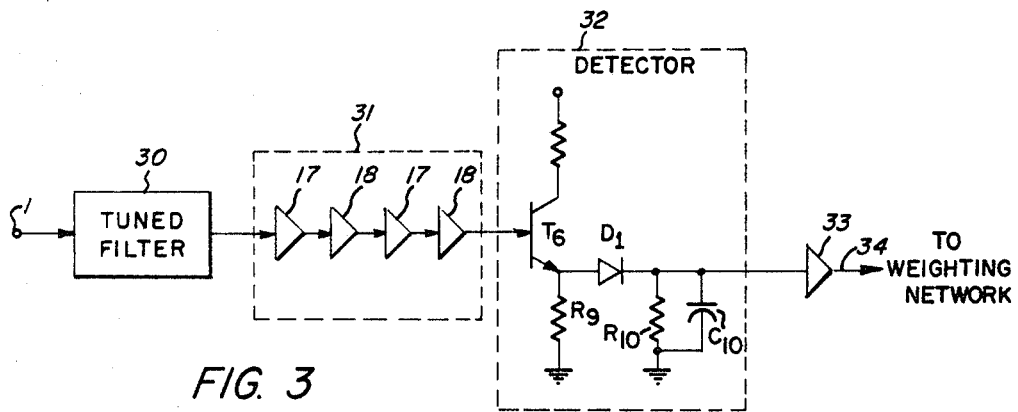
FIG. 3 is a diagrammatic presentation of the linear-limiting amplifier and detector shown in FIG. 1.

Linear limiting amplifier 12 and detector 13 are schematically shown in FIG. 3. The linear limiting amplifier comprises a tuned filter 30 connected to input node 1 driving an amplifier chain 31. The amplifier chain may consist of amplifiers 17 and 18 cascaded in series. The amplifier chain drives detector 32 through transistor $T_6$ in an emitter follower configuration. A diode D and RC circuit formed from $R_{10}$ and $C_{10}$ produce a unidirectional waveshape corresponding to the pulse envelope of the intermediate frequency burst applied to node 1. Of course, tuned filter 30 must have a bandwidth sufficient to encompass the pulse envelope.

The output of the detector is isolated and amplified by amplifier 33 prior to being applied to the weighting network 14.

Figure 4A:
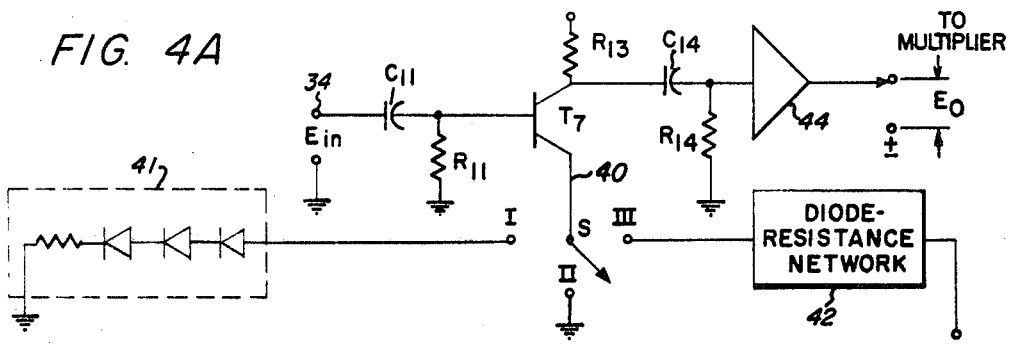
FIG. 4A is a circuit diagram of the weighting network shown in FIG. 1.
Figure 4B:
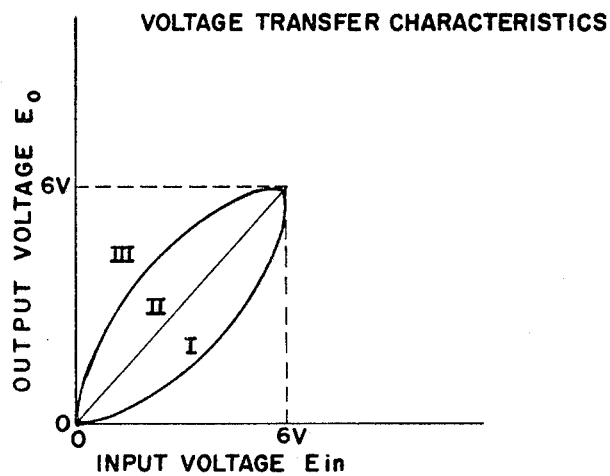
FIG. 4B is the input-output voltage transfer characteristic of the weighting network.

Weighting network 14 is shown in FIG. 4A and has applied to it the output from the detector amplifier 33 at input 34. This input is applied to transistor $T_7$ through the coupling network formed from $R_{11}$ and $C_{11}$. Significantly, the emitter of $T_7$ is terminated in switch S over line 40. Switch S may be selectively connected to any one of three terminals designated as I, II, and III. Connected to switch terminals I and III are diode resistance networks 41 and 42 respectively. The voltage transfer characteristic shown in FIG. 4B serves to modify the detector characteristic of envelope detector 13. The voltage transfer characteristic is a plot of the output voltage versus the input voltage when switch S is respectively set at switch position I, II, or III.

As may be observed, when switch S is set at I the diode resistance network 41 modifies the transfer characteristic so as to approximate a positive parabolic characteristic about the ordinate. When the switch is in position II, the transfer characteristic is linear. When the switch is in position III, the transfer characteristic is non-linear approximating a parabola about the abscissa. The output of the weighting network is applied through coupling network $R_{14}C_{14}$ to amplifier 44 which is applied as one input to multiplier 4 via line 15. Because the response characteristic of network 14 may be selectively altered, it may be said to compensate for non-linearity in the detector 13 response. Illustratively, if detector 13 operates as a square law detector as I in FIG. 4B. Then network 14 characteristic can be set to operate as III to compensate.

Figure 5:
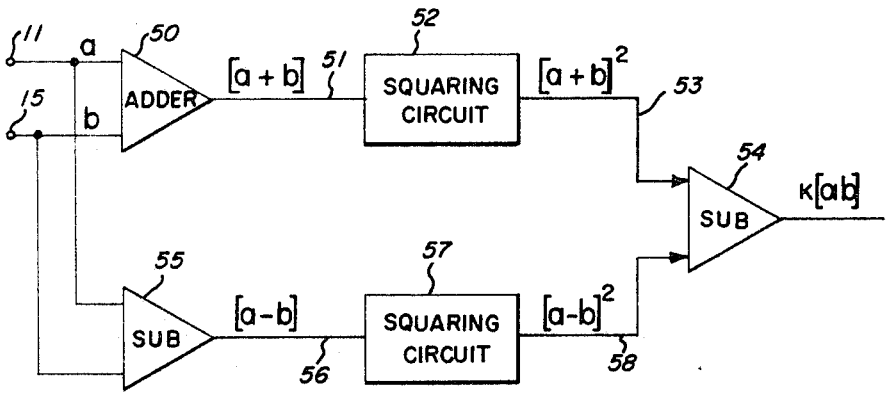
FIG. 5 is a block diagram of the multiplier as shown in FIG. 1.

FIG. 5 shows a schematic functional block diagram of the multiplier. Let the signal appearing on line 11 from the first signal branch be symbolically represented as $a$ and the signal appearing from the weighting network on line 15 be represented as $b$. The purpose of the multiplier is to form a product signal of $ab$. This is implemented by algebraically forming the following relationship:

$$(a+b)^2 - (a-b)^2 = 4ab$$

A sum signal $(a+b)$ is formed by adder 50 and applied to squaring circuit 52 over line 51. A difference signal $(a-b)$ is formed by subtractor 55 and applied to the squaring circuit 57. The sum signal squared $(a+b)^2$ is applied to subtractor 54 over line 53. Likewise, the difference signal squared $(a-b)^2$ is applied to subtractor 54 over line 58. The difference between the two signals is mathematically $4ab$, which difference may be conveniently adjusted by a resistive network to yield $ab$.

Figure 6:
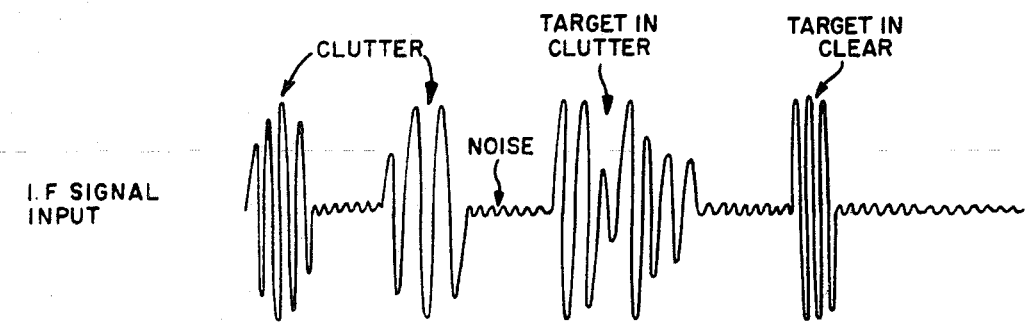
FIG. 6 shows typical waveforms as they appear at selected points in the apparatus shown in FIG. 1.
Figure 6:
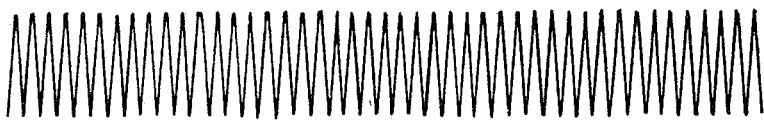
Figure 6:
Figure 6:
Figure 6:
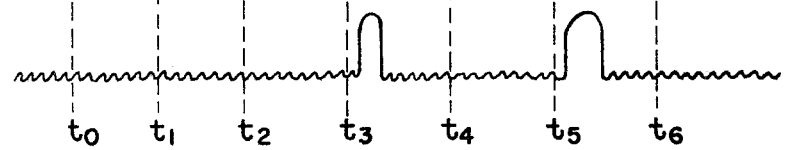

FIG. 6 shows typical waveforms appearing at selected points in the apparatus. The IF input signal appearing at node 1 shows clutter signals and noise, a target embedded in clutter and a target in the clear. The signal appearing from the hard limiting amplifier output 6 shows the stripping away of all amplitude information and the preservation of phase information only. The output from full wave rectifier 10 indicates that a target signal may still be embedded in noise with some clutter residue. Detector output 13 is shown with a minimum of noise. The substantially enhanced phase difference signal is obtained by the product of the full wave rectifier output and the detector output.

Significantly, the multiplier does not produce a signal unless a signal is present at both the detector and full-wave rectifier outputs. This is diagrammatically shown in FIG. 6 considering output waveshape 4 and input waveshapes 10 and 13. A product signal occurs only upon signal appearances at both multiplier inputs during time intervals $t_3 t_4$ and $t_5 t_6$.

In summary, it has been shown that Doppler signals embedded in clutter and noise may be extracted if phase only information of each pulse of a series of periodically received echo pulses is applied to a conventional canceller. The output of the conventional canceller is a signal which varies as the phase difference between successive pulses and a reference phase. If the phase difference signal from the canceller is multiplied by an extracted pulse envelope, then a substantially reenforced clutter-free phase difference signal results. The applying of the phase only information is equivalent to eliminating all the amplitude information. This, of course, also eliminates the encrusting of unwanted signals. However, an MTI signal may still be embedded in noise or clutter residue as it appears from the canceller. To recover the MTI signal, the signal is multiplied by the detected pulse envelope. By eliminating the linear limiting amplifier from the first processing or cancellation path and thus limiting the unwanted clutter spectral spread, hard limiting is required in the canceller path. A linear limiter as used in the second path prevents the peaks of clutter residue from getting through to the MTI output when the phase difference signal and pulse envelope is multiplied.

I claim:
1. A moving target indicator clutter reducing apparatus comprising:
 means responsive only to the phase information of each pulse of a series of periodically received echo pulses for generating a signal varying as the phase difference between successive pulses and a reference phase;
 an envelope detector responsive to each pulse; and
 means for forming a product signal of the envelope detector response and the phase difference signal.
2. A moving target indicator clutter reducing apparatus according to claim 1, characterized in that the means for generating the phase difference signal comprise:
 means for hard-limiting each received echo pulse; and
 means for generating a unipolar signal varying as the phase difference between successive hard-limiting signals and a reference phase.
3. A moving target indicator clutter reducing apparatus according to claim 1, characterized in that the envelope detector comprises:
 a linear limiting amplifier responsive to the received echo pulses;
 a detector for extracting the pulse envelope from each amplified echo pulse; and
 a weighting network responsive to the extracted pulse envelope for compensating for non-linearity in the detector voltage characteristic.
4. A moving target indicator clutter reducing apparatus according to claim 1, characterized in that the means for forming the product signal comprise:
 means for forming the square of the sum of the amplitudes of the phase difference signal and the envelope detector response;
 means for forming the square of the amplitude difference between the phase difference signal and the envelope detector response; and
 means for subtracting the square of the difference signal from the square of the sum signal.
5. A moving target indicator clutter reducing apparatus comprising:
 means responsive only to the phase information of each pulse of a series of periodically received echo pulses for generating a signal varying as the phase difference between successive pulses and a reference phase;
 an envelope detector responsive to each received echo pulse;
 a multiplier for forming a product signal of the envelope detector response and the phase difference signal; and
 means for modifying the detector characteristic such that the multiplier output remains constant where the received echo signals selectively comprise noise or clutter or both.
6. An apparatus according to claim 5, characterized in that the means for modifying the detector characteristic comprise a weighting network interposed between the detector and the multiplier and further characterized by an output-input voltage transfer characteristic having nonlinear curvature.
7. An apparatus for extracting a Doppler signal out of noise and clutter comprising:
 a first signal processing path responsive to incident echo signals for cancelling clutter;
 a second signal processing path also responsive to incident echo signals comprising:
  a linear limiting amplifier having a dynamic range approximately equal to the clutter attenuation of the first channel; and
  a detector coupling the linear limiting amplifier;
 the apparatus further comprises:
 a multiplier for forming a product signal from the detector response and from the output of the first path; and
 means for altering the detector characteristic so that the multiplier output will remain constant where the incident echo signals selectively comprise noise or clutter or both.

References Cited

UNITED STATES PATENTS 3,042,915   7/1962   Nordell _____ 343—7.7

RODNEY D. BENNETT, JR., *Primary Examiner.*

CHARLES L. WHITHAM, *Assistant Examiner.*